(12) United States Patent
Tsukimura

(10) Patent No.: US 8,390,883 B2
(45) Date of Patent: Mar. 5, 2013

(54) IMAGE PROCESSING APPARATUS, IMAGE FORMING APPARATUS, AND RECORDING MEDIUM FOR OVERPRINT PROCESSING

(75) Inventor: Shigeru Tsukimura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 599 days.

(21) Appl. No.: 12/548,573

(22) Filed: Aug. 27, 2009

(65) Prior Publication Data

US 2010/0245860 A1 Sep. 30, 2010

(30) Foreign Application Priority Data

Mar. 26, 2009 (JP) ................................ 2009-077530

(51) Int. Cl.
*G06F 15/00* (2006.01)
(52) U.S. Cl. ........................................................ 358/1.9
(58) Field of Classification Search .................. 358/1.9, 358/527
See application file for complete search history.

(56) References Cited

U.S. PATENT DOCUMENTS

| | | | | |
|---|---|---|---|---|
| 4,679,074 A | * | 7/1987 | Sugiura et al. ............... | 358/523 |
| 5,479,587 A | * | 12/1995 | Campbell et al. ............. | 358/1.17 |
| 5,799,235 A | * | 8/1998 | Nakano et al. ................ | 399/302 |
| 2003/0011797 A1 | * | 1/2003 | Takemoto ...................... | 358/1.9 |
| 2003/0128377 A1 | * | 7/2003 | Ebner ............................. | 358/1.9 |
| 2004/0179860 A1 | * | 9/2004 | Watanabe et al. ............. | 399/149 |
| 2008/0247642 A1 | | 10/2008 | Eguchi | |

FOREIGN PATENT DOCUMENTS

| | | |
|---|---|---|
| JP | 10-200736 A | 7/1998 |
| JP | 2005-039422 A | 2/2005 |
| JP | 2007-184865 A | 7/2007 |
| JP | 2008-259101 A | 10/2008 |

OTHER PUBLICATIONS

Japanese Office Action for corresponding Japanese patent application No. 2009-077530 dated Dec. 7, 2010.
Japanese Office Action mailed May 10, 2011 for corresponding Japanese patent No. 2009-077530.

* cited by examiner

*Primary Examiner* — Benny Q Tieu
*Assistant Examiner* — Jeremiah Bryar
(74) *Attorney, Agent, or Firm* — Sughrue Mion, PLLC

(57) ABSTRACT

An image processing apparatus that comprises an obtaining section that obtains data of numerical values or numerical expressions used to describe a drawing process, and a generating section that generates, based on data obtained by the obtaining section, image information including color information on a color of each of a plurality of pixels, the image information having a first set of color information that describes using a color space different from a color space defined by colors of colorants used by an image forming section, and a second set of color information that specifies an amount of black colorant used by the image forming section.

13 Claims, 5 Drawing Sheets

| TONE VALUES OF B, G, AND R COMPONENTS OF OVERLAP DRAWING IMAGE | OVERLAP DRAWING FLAG | DENSITY INFORMATION |
|---|---|---|
| 4C4C4C(70%) | 1 | 00000 |
| 4B4B4B(71%) | 1 | 00001 |
| 4A4A4A(72%) | 1 | 00010 |
| ... | ... | ... |
| 010101(99%) | 1 | 11110 |
| 000000(100%) | 1 | 11111 |

| DENSITY INFORMATION | K COMPONENT TONE VALUE |
|---|---|
| 00000 | B3(70%) |
| 00001 | B4(71%) |
| 00010 | B5(72%) |
| ... | ... |
| 11110 | FE(99%) |
| 11111 | FF(100%) |

IMAGE PROCESSING APPARATUS, IMAGE FORMING APPARATUS, AND RECORDING MEDIUM FOR OVERPRINT PROCESSING

CROSS-REFERENCE TO RELATED APPLICATIONS

This application is based on and claims priority under 35 USC 119 from Japanese Patent Application No. 2009-077530 filed Mar. 26, 2009.

BACKGROUND

1. Technical Field

The present invention relates to image processing apparatuses, image forming apparatuses, and recording media.

2. Related Art

So-called overprint processing techniques are known in which a separate image (object) such as characters or diagrams or the like are formed overlapping on top of an image expressing scenery or the like as a background. When overprint processing is carried out, even in a case where the positions for forming the images of multiple colors are displaced from their targeted positions, an appearance of an image defect known as "white gaps" can be inhibited in which the surface of the paper is exposed. Overprint processing in which a separate black image is formed overlapping an image that is set as the background is referred to as black overprint processing.

As one format for describing data pertaining to an image on a computer there is a format in which a process for drawing an image is described using numerical values or numerical expressions and is commonly referred to as a "vector format". An image forming apparatus such as a printer that receives this data executes a rendering process by interpreting the data, and generates raster format image information in which color information is described that expresses the color of each of the multiple pixels. If this rendering process is executed using a color space defined by cyan (C), magenta (M), yellow (y), and black (K) for example (hereinafter referred to as a "CMYK color space"), which are the colors of colorants used by the image forming apparatus, then black overprint processing is executed by merely specifying the amounts of colorants to be disposed in respective positions on the sheet of paper. For example, this applies to a case where the rendering process is carried out using PS (PostScript). In contrast to this, in a case where the rendering process is carried out using PCL (Printer Command Language) or the like, a color space is used that is defined by red (R), green (G), and blue (B) (hereinafter referred to as an "RGB color space"), which is suitable for displaying on a display, and this is different from the color space defined by the colors of the colorants.

SUMMARY

According to an aspect of the invention, there is provided an image processing apparatus comprising an obtaining section that obtains data of numerical values or numerical expressions used to describe a drawing process, and a generating section that generates, based on data obtained by the obtaining section, image information including color information on a color of each of a plurality of pixels, the image information having a first set of color information that describes using a color space different from a color space defined by colors of colorants used by an image forming section, and a second set of color information that specifies an amount of black colorant used by the image forming section.

BRIEF DESCRIPTION OF THE DRAWINGS

An exemplary embodiment of the present invention will be described in detail based on the following figures, wherein.

DETAILED DESCRIPTION

1. Configuration of Exemplary Embodiment

Figure 1:
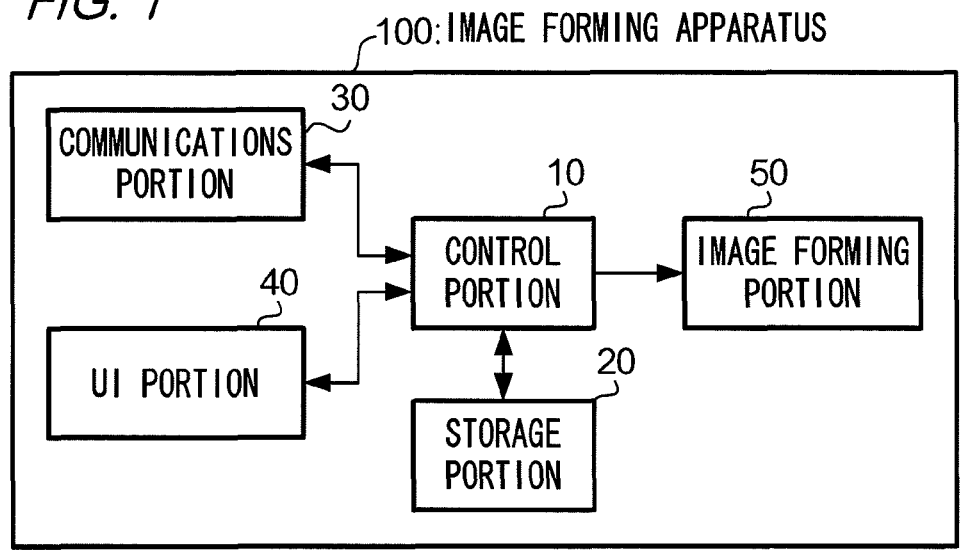
FIG. 1 is a block diagram showing a configuration of an image forming apparatus.

Hereinafter, exemplary embodiments relating to the present invention are described with reference to the accompanying drawings. FIG. 1 is a block diagram showing a configuration of an image forming apparatus 100. A control portion 10 is provided with a computation device including components such as a CPU (central processing unit) and an ASIC (application specific integrated circuit), a RAM (random access memory) that provides a work area, and a ROM (read only memory) that stores various control programs. The computation device controls various portions of the image forming apparatus 100 in accordance with procedures described in the control programs and programs stored in a storage portion 20. For example, the control portion 10 realizes a printer driver by executing programs stored in the storage portion 20. The storage portion 20 is a storage device such as an HDD (hard disk drive) for example and stores various programs. A communications portion 30 is for example a modem of some type for carrying out communications and communicates with external devices such as personal computers or the like. A UI portion 40 is provided with a display screen, a transparent touch panel arranged over this display screen, and multiple operation keys, and handles the reception of operations from the user and notifications of information with images.

An image forming portion 50 is an electrographic printer for example, and is one example of an image forming section according to the present invention that uses toner to form an image on a recording medium in accordance with image information received from the control portion 10.

The image forming portion 50 is provided for each of cyan (C), magenta (M), yellow (Y), and black (K) toner, and each image forming portion 50 includes a photosensitive drum, a charging portion, an exposing portion, a developing portion, and a transfer portion. The photosensitive drums are drum shaped members that revolve at a specified velocity centered on a shaft, and are charged to a specified electric potential by the charging portions. The exposing portions form an electrostatic latent image by irradiating a laser light onto the charged photosensitive drums. The developing portions cause toner to adhere to the electrostatic latent images that have been formed on the photosensitive drums to develop these as toner images. The transfer portions transfer the toner images of each color developed on the photosensitive drums to a sheet such as a paper. The transfer portions transfer the toner image of each color in the order of C, M, Y, and K in order of proximity to the sheet surface. That is, as viewed by a user, the K toner is positioned on the uppermost surface. A fixing portion fixes the toner images that have been transferred to the transfer sheet.

Figure 2:
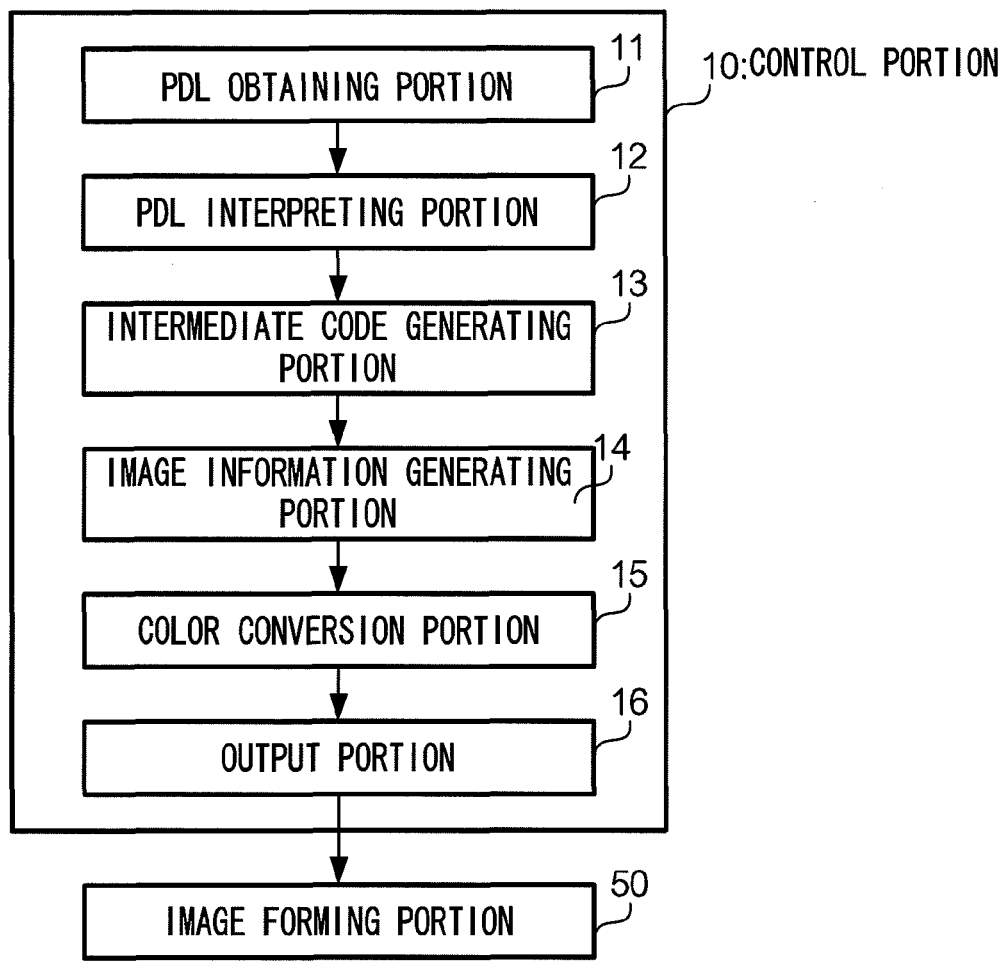
FIG. 2 is a block diagram showing one example of a functional configuration when a control portion realizes a printer driver.

FIG. 2 is a block diagram showing one example of a functional configuration when the control portion 10 realizes a printer driver.

As shown in FIG. 2, the control portion 10 realizes functions of a PDL obtaining portion 11, a PDL interpreting portion 12, an intermediate code generating portion 13, an image information generating portion 14, a color conversion portion 15, and an output portion 16.

The PDL obtaining portion 11 is one example of an obtaining section according to the present invention, and obtains data (hereinafter referred to as "PDL data") described in a PDL (page description language) format, and outputs the obtained data to the PDL interpreting portion 12. PDL data is one example of data in which a process of drawing an image is described in numerical values or numerical expressions. For example, this data is received at the image forming apparatus 100 from an external device connected via the communications portion 30.

The PDL interpreting portion 12 interprets the PDL data outputted by the PDL obtaining portion 11 and outputs an interpreted result to the intermediate code generating portion 13.

The intermediate code generating portion 13 generates intermediate code in page units of the image information suited to rendering processes and the like based on the interpretation result of the PDL interpreting portion 12 and outputs the generated intermediate code to the image information generating portion 14. The intermediate code indicates a data expression format for processing image data within the printer driver.

The image information generating portion 14 is one example of a generating section according to the present invention, and executes a "rendering process" of generating raster format image information (hereinafter referred to as "raster image information") in which color information that indicates a color for each pixel is described based on the PDL data obtained from the PDL obtaining portion 11. Upon accumulating a one page portion of intermediate code generated by the intermediate code generating portion 13, the image information generating portion 14 generates raster image information by executing the rendering process based on the intermediate code.

Figure 3:
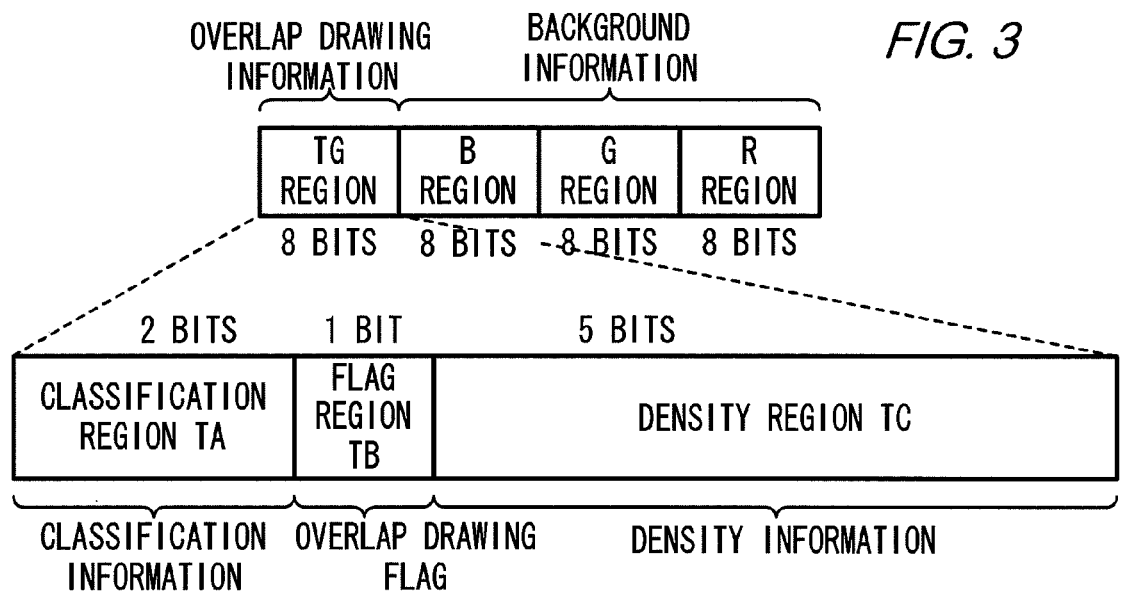
FIG. 3 is a diagram for describing a data structure of color information described for pixels of raster image information generated by a rendering process.

FIG. 3 is a diagram for describing a data structure of color information described for each of multiple pixels of raster image information generated by the rendering process.

As shown in FIG. 3, based on the intermediate code generated by the intermediate code generating portion 13, the image information generating portion 14 generates raster image information that describes color information (hereinafter referred to as "background information") that indicates a color of an image corresponding to a background (hereinafter referred to as "background image") and color information (hereinafter referred to as "overlap drawing information"), which is color information that indicates a color of a different image (hereinafter referred to as "overlap drawing image") to be formed overlapping the background image and that specifies an amount of black (K) toner used by the image forming portion 50. In the present exemplary embodiment, a process in which the image forming apparatus 100 uses a black colorant to form an image overlapping a background image is referred to as an "overlap drawing process". It should be noted that background information is one example of a first set of color information according to the present invention and overlap drawing information is one example of a second set of color information according to the present invention.

A data region in which the "background information" is described is broadly divided into a "B region", a "G region", and an "R region". The background information is color information in which the colors of the background image are described using an RGB color space. Blue (B) component color information is described in the B region, green (G) component color information is described in the G region, and red (R) component color information is described in the R region. In each of the B region, G region, and R region, tone values indicating a strength of color depth of the individual color component is described using an information amount of 8 bits (256 gradations). That is, the background information holds an information amount of 8 bits×3 colors=24 bits. It should be noted that, for convenience, the tone values in the RGB color space are hereinafter expressed as information of 3 colors x 256 gradations. This information expresses tone values in each of the R, G, and B color components in two-digit hexadecimal numbers (namely, 256 gradations of "00" to "FF") and indicate colors obtained when the primary colors of these tones have undergone additive color mixing. For example, red (R) is expressed as "FF0000" and yellow is expressed as "FFFF00". It should be noted that although it is described later, the tone values for each of the color components in a CMYK color space are also expressed using an information amount of 8 bits (256 gradations), and in the description hereinafter are expressed in hexadecimal notation.

The data region in which the "overlap drawing information" is described is a region TG. The region TG is broadly divided into a "classification region TA", a "flag region TB", and a "density region TC". In the classification region TA, identifying information for identifying a classification of the image information (hereinafter referred to as "classification information") is described. In the present exemplary embodiment, either one of classification information "01" indicating "photo image", which is an image signifying a photo, classification information "10" indicating "character image", which is an image signifying characters, and classification information "11" indicating "graphic", which is an image signifying pictures, diagrams, or graphic art or the like, is described in an information amount of 2 bits. When carrying out color conversion from an RGB color space to a CMYK color space for example, this classification information is referenced in cases such as where different conversion parameters are used in response to the classification of an image. In the flag region TB, identifying information for identifying whether or not a pixel is a target for the overlap drawing process (hereinafter referred to as "overlap drawing flag") is described. Specifically, either "1", which signifies it being a target for the overlap drawing process or "0", which signifies it not being a target for the overlap drawing process, is described using an information amount of one bit. In the density region TC, information for specifying a density of the overlap drawing image (hereinafter referred to as "density information") is described. In other words, the density information is information that specifies an amount of black (K) toner used by the image forming portion 50. The density information is described in the density region TC in an information amount of 5 bits. That is, 32 gradations of density are expressed with binary data in a manner of "00000", "00001", . . . , "11110", and "11111", and here densities in a range of 70% to 100% are expressed in 1% increments of "70%", "71%", . . . , "99%", and "100%". It should be noted that in the present exemplary embodiment, "density" refers to a coverage rate of toner with respect to a unit surface area on the sheet, with 0% indicating no color and 100% indicating so-called solid color. Furthermore, a reason that density information is defined only for comparatively high densities such as where the density is 70% or higher is described later.

Overlap drawing information having the above-described data structure has an information amount of 2 bits (classification information)+1 bit (overlap drawing flag)+5 bits (density information)=a total of 8 bits. Accordingly, color information of an information amount of a total of 32 bits is described for each pixel contained in the raster image information generated by the image information generating portion 14.

Description is given returning to FIG. 2. The color conversion portion 15 is one example of a color conversion section according to the present invention, and executes a "color conversion process" in which color information described in an RGB color space (that is, background information) and overlap drawing information are converted to color information described in a CMYK color space. In this color conversion process, the color conversion portion 15 converts the color space in which the background information is to be described to a CMY color space, and furthermore, when an overlap drawing flag "1" is described in the flag region TB, converts the tone values of the black (K) component that represents the amount of black (K) toner, which is specified by the density information described in the density region TC. The conversion from an RGB color space to a CMY color space of the background information is carried out using conversion parameters described in a control program followed by the control portion 10, and an equivalent technique to any commonly known color space conversion may be used.

It should be noted that in a case where the overlap drawing flag is "0", it is specified by the overlap drawing information that black (K) toner is not used. In this case, the color conversion portion 15 converts the CMY color space in which the background information is described to the CMYK color space by implementing a background removal process without carrying out color conversion based on the overlap drawing information.

The output portion 16 outputs the raster image information that has undergone color conversion processing by the color conversion portion 15 to the image forming portion 50.

2. Operations of Exemplary Embodiment

Next, description is given regarding operations executed by the control portion 10 of the image forming apparatus 100.

2-1. Rendering Process

Figure 4:
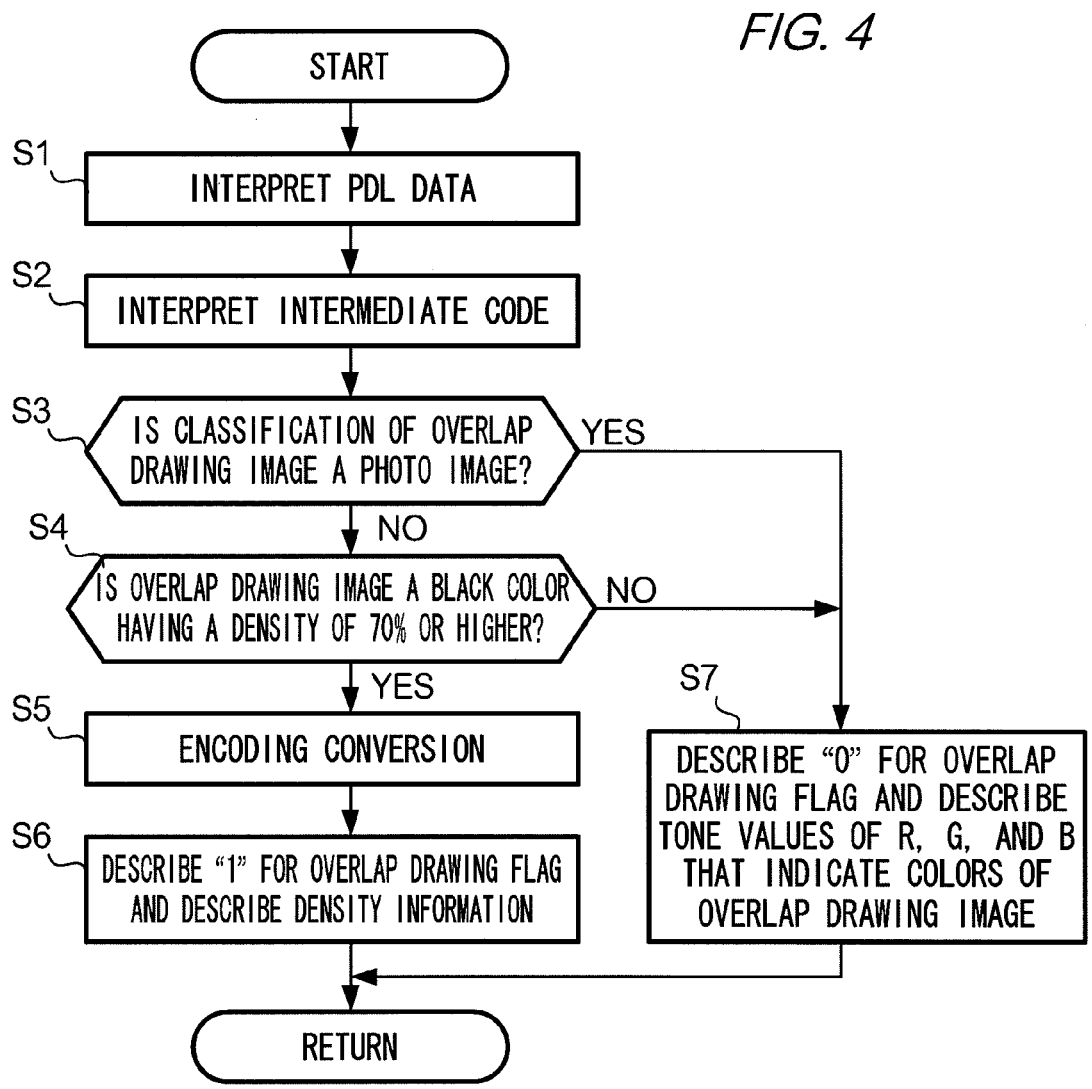
FIG. 4 is a flowchart showing an operational procedure of a rendering process executed by the control portion.

First, description is given regarding a "rendering process" executed by the control portion 10 (image information generating portion 14). FIG. 4 is a flowchart showing a procedure of a rendering process executed by the control portion 10. It should be noted that the control portion 10 executes the processing steps described below in units of overlap drawing images (objects) contained in the PDL data.

When PDL data received for forming an image is obtained from the communications portion 30, the control portion 10 interprets this PDL data (step S1). The control portion 10 generates intermediate code based on an interpretation result of the PDL data and interprets this intermediate code (step S2). Then, based on the intermediate code, the control portion 10 determines whether or not the image expressed by the image data is a photo image (step S3). When the control portion 10 determines that it is not a photo image (that is, it is a character image or a graphic) (step S3; no), the procedure proceeds to step S4. Next, based on an interpretation result of the intermediate code, the control portion 10 determines whether or not the overlap drawing image is a black color having a density of 70% or higher (step S4). Here, when the control portion 10 determines "yes", the procedure proceeds to step S5.

The control portion 10 carries out encoding conversion based on the intermediate code (step S5). From this encoding conversion, the control portion 10 obtains the overlap drawing flag described in the flag region TB and the density information described in the density region TC. First, based on the intermediate code, the control portion 10 calculates tone values (total of 24 bits) of the color components of R, G, and B corresponding to the colors of the overlap drawing image. Then, the control portion 10 carries out encoding conversion in which the calculated R, G, and B tone values are converted to 5-bit density information.

Figures 5, 6:
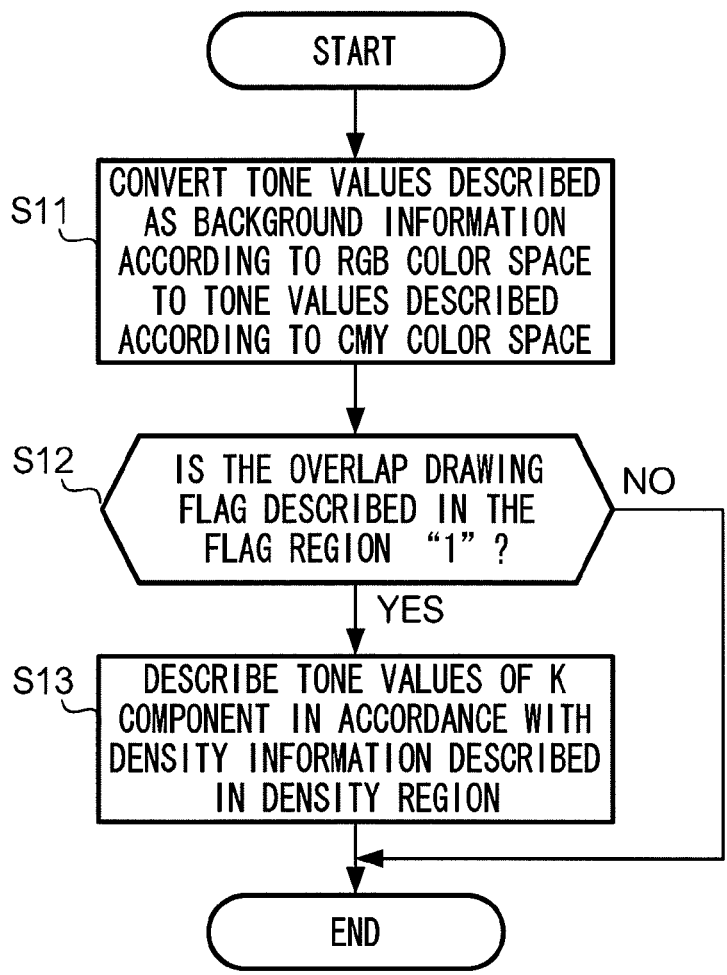
FIG. 5 is diagram for describing content of encoding conversion.
FIG. 6 is a flowchart showing a procedure of a color conversion process executed by the control portion.

FIG. 5 is a diagram showing a correspondence table used in encoding conversion. The control portion 10 carries out encoding conversion in accordance with relationships of correspondence described in the correspondence table shown in FIG. 5. The data indicated in the correspondence table is described in a control program followed by the control portion 10 for example. In FIG. 5, the tone values of the overlap drawing image are described in information amounts of 8 bits for B, G, and R respectively in this order.

In the correspondence table shown in FIG. 5, the tone values of B, G, and R components of the overlap drawing image are associated with the overlap drawing flag and density information. It should be noted that in FIG. 5, the numerical value shown in parentheses indicates a corresponding density and is not in fact described in the data.

For example, a tone value "4C4C4C", an overlap drawing flag "1", and density information "00000" are associated. A color indicated by a tone value of "4C4C4C" corresponds to a black color having a density of 70% and the density information that indicates that color is expressed as "00000". Furthermore, a tone value "4B4B4B", an overlap drawing flag "1", and density information "00001" are associated. A color described by a tone value of "4B4B4B" is a color corresponding to a black color having a density of 71% and the density information that indicates that color is expressed as "00001". Furthermore, a tone value "00000", an overlap drawing flag "1", and density information "11111" are associated. That is, a color described by a tone value of "00000" is a color corresponding to a black color having a density of 100% and the density information that indicates that color is expressed as "11111". For densities in 1% increments from a density of 70% to 100%, this correspondence table describes B, G, and R component tone values corresponding to the black color of that density in association with an overlap drawing flag and density information.

For example, when the control portion 10 calculates "4C4C4C" as the B, G, and R component tone values indicating a color of an overlap drawing image, this undergoes encoding conversion to an overlap drawing flag of "1" and density information of "00000" in accordance with the correspondence table shown in FIG. 5.

Next, the control portion 10 uses a result of the encoding conversion executed at step S5 to generate raster image information in which color information expressing the color of each pixel is described (step S6). First, the control portion 10 describes the tone values of the R, G, and B color components that express the color of the background image in regions corresponding to a B region, a G region, and an R region respectively. Next, the control portion 10 uses a result of the encoding conversion executed at step S5 to describe the flag region TB as "1" and to describe density information in the density region TC. Furthermore, once the control portion 10 has determined the classification of the image information at step S3, it describes the classification information according to that determination in the classification region TA.

In this manner, in the raster image information that has been generated by the control portion 10 executing the rendering process there are tone values of the R, G, and B color components expressing the color of the background image and overlap drawing information in which a K toner amount used in the overlap drawing image is specified. That is, color information that expresses two types of images, these being a background image and an overlap drawing image, is contained in the raster image information generated by this rendering process.

Incidentally, in a case where the determination result at step S3 is "yes", the control portion 10 proceeds to step S7. That is, in a case where the classification is photo image, the control portion 10 proceeds to step S7 and carries out a rendering process for a case where the overlap drawing process is not to be executed. Specifically, first the control portion 10 describes "0" as the overlap drawing flag in the flag region TB and describes "00000" as the density information in the density region TC. In this way, the control portion 10 has generated raster image information in which overlap drawing information is described that specifies for black toner not used (that is, "0" is described as the overlap drawing flag). At this time, the control portion 10 calculates the tone values of the R, G, and B that express the color of the overlap drawing image and describes these in regions corresponding to the R region, G region, and B region (step S7). In this way, although the overlap drawing process is not carried out, the image information that expresses the color of the overlap drawing image is described in the regions of the background information. It should be noted that here photo images are excluded from targets for the overlap drawing process according to common knowledge that photo images are unsuited to overlap drawing processes, but they may included as targets for overlap drawing processing.

Furthermore, also in a case where "no" is determined at step S4, the control portion 10 proceeds to step S7 and carries out a rendering process for a case where the overlap drawing process is not to be executed. For example, this is based on common knowledge that, in a case where the density of an overlap drawing image is lower than 70%, the background image formed underneath this will become clearly visible and the overlap drawing process will not be executed as intended. It should be noted in regard to classifications of images to be targeted for overlap drawing processing and densities of overlap drawing images that these may be fixed at values determined at a design stage or may be set as values in the image forming apparatus 100 by the user such that the control portion 10 operates in accordance with the content of these settings.

2-2. Color Conversion Processing

Next, description is given regarding a "color conversion process" executed by the control portion 10 (color conversion portion 16).

FIG. 6 is a flowchart showing a procedure of a process relating to color conversion processing executed by the control portion 10. It should be noted that the control portion 10 executes the following procedural steps in pixel units of the raster image information.

Of the color information contained in the raster image information, the control portion 10 converts the tone values described as background information according to the RGB color space to tone values described according to the CMY color space (step S11).

Next, the control portion 10 determines whether or not the overlap drawing flag described in the flag region TB is "1" (step S12). Here, when the control portion 10 determines that the overlap drawing flag is "1" (step S12; yes), the procedure proceeds to step S13 with this pixel being a pixel targeted for overlap drawing processing. Then, the control portion 10 describes the tone value of the black (K) component based on the density information described in the density region TC (step S13). In other words, the control portion 10 converts the CMY color space in which the background information is described to the CMYK color space in accordance with the overlap drawing information. At step S13, the control portion 10 carries out a decoding conversion in which density information described in the density region TC is converted to a tone value of the K component in the CMYK color space.

Figures 7, 8:
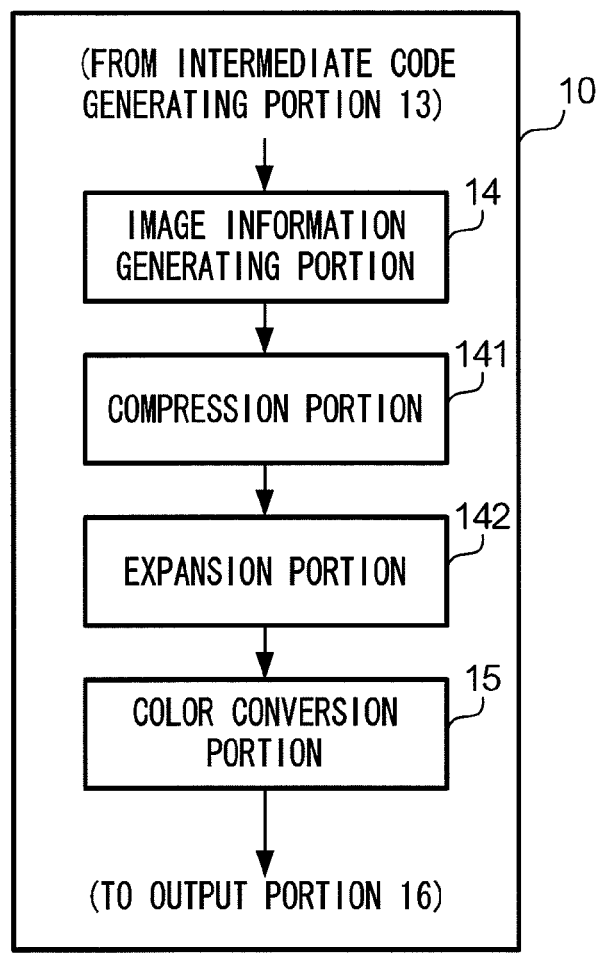
FIG. 7 is diagram for describing content of decoding conversion.
FIG. 8 is a diagram showing one example of a functional configuration when the control portion realizes a printer driver.

FIG. 7 is a diagram showing a correspondence table used in decoding conversion.

The control portion 10 carries out decoding conversion in accordance with relationships of correspondence described in the correspondence table shown in FIG. 7. The data indicated in the correspondence table is described in a control program followed by the control portion 10.

In the correspondence table shown in FIG. 7, density information is associated with tone values of the K component in the CMYK color space. It should be noted that in FIG. 7, the numerical value shown in parentheses indicates a corresponding density and is not in fact described in the data.

For example, density information "00000" is associated with a K component tone value "B3". Density information of "00000" indicates a black color having a density of 70% and the K component tone value that indicates that color is expressed as "B3". Furthermore, density information "00001" is associated with a K component tone value "B4". That is, density information of "00001" indicates a black color having a density of 71% and the K component tone value that indicates that color is expressed as "B4". Furthermore, density information "11111" is associated with a K component tone value "FF". That is, density information of "11111" indicates a black color having a density of 100% and the K component tone value that indicates that color is expressed as "FF". In this correspondence table also, density information is described in association with K component tone values in CMYK color components for densities in 1% increments from a density of 70% to 100%.

For example, when the control portion 10 determines that the density information contained in the overlap drawing image is "00010", then it performs decoding conversion on this to a K component tone value of "B5" in accordance with the correspondence table shown in FIG. 7. Then, from the tone values of the color components of the CMY color space obtained by the color space conversion of step S11 and the tone values of the K component obtained by the decoding conversion, the control portion 10 obtains color information in which color information is described for each color component in the CMYK color space.

When the control portion 10 executes the above-described color conversion processing for all the pixels, raster image information is generated in which tone values are described in accordance with the CMYK color space. Then, the control portion 10 outputs raster image information to the image forming portion 50 and an image corresponding to this raster image information is formed in the image forming portion 50. In a case where the overlap drawing process is to be carried out, the control portion 10 forms a background image (one example of a first image according to the present invention) using an amount of toner expressed by the tone values (color information) of each color component of C, M, and Y converted in accordance with the background information, then forms an overlap drawing image (one example of a second image according to the present invention) so as to overlap the background image using an amount of black (K) toner expressed by the tone values (color information) of the K component converted in accordance with the overlap drawing information.

On the other hand, in a case where "no" is determined at step S12, since this signifies that this pixel is not a target for the overlap drawing process, the control portion 10 executes background removal processing and converts the CMY color space, which was converted at step S11, to the CMYK color space, and causes an image corresponding to the tone values of these color components to be formed in the image forming portion 50. At this time, the control portion 10 may use for example a DLUT (direct look-up table) or the like to convert the color space in which the tone values of the background image contained in the raster image information is expressed from an RGB color space to tone values described using a CMYK color space.

3. Modified Example

The present invention can be executed in other embodiments than the above-described exemplary embodiment. Also, any of the modified examples shown below may be combined.

3-1. Modified Example 1

In the foregoing exemplary embodiment, description was given of an example of the control portion 10 being installed inside the image forming apparatus 100, but the control portion 10 is not limited to being installed inside the image forming apparatus 100 and, for example, may be achieved by a computer device connected via a communications section such as a USB (universal serial bus) cable or a LAN (local area network) or the like to an image forming apparatus. In this case, the computer device controls the image forming apparatus by generating raster image information in which color information is described that indicates a color of each of multiple pixels based on obtained PDL data, then generating raster image information that describes color information, which expresses colors of a color space different from a color space defined by colors of colorants used by the image forming apparatus, and color information, which specifies an amount of black colorant used by the image forming apparatus, and outputting this to the image forming apparatus. Furthermore, an output destination of the raster image information of the computer device may be a component not having a function for forming an image such as a different computer, and an image forming apparatus is controlled in accordance with the raster image information at the time of image forming.

Furthermore, in the foregoing exemplary embodiment, functions realized by the printer driver of the control portion 10 may be realized by a printer controller. Furthermore, these functions may be realized by a single or multiple hardware circuits, or may be realized by a computation device executing a single or multiple programs, or may be realized by a combination of these.

3-2. Modified Example 2

In transferring data from the image information generating portion 14 to the color conversion portion 15, since there is a massive amount of information to undergo transfer when using the generated raster image information as it is, sometimes considerable time may be required to perform transmission via the bus inside the control portion 10. Furthermore, although the color conversion portion 15 executes color conversion processing after accumulating the received raster image information in its own image memory, the storage capacity of this image memory is also limited. Thus, it has long been common when generating raster image information to perform transfer by compressing the raster image information.

It has long been common for tone values to be described for each pixel in information amounts of 32 bits or 64 bits, but since information corresponding to overlap drawing information has not been described, this data region (a data region corresponding to the region TG) has been unnecessary. Accordingly, in order to increase the compression ratio when performing data compression, information such as "00000000" for example that possesses no particular significance was described in this data region. In contrast to this, since overlap drawing information is described in this region in the foregoing exemplary embodiment, the information amount of the raster image information becomes larger.

Accordingly, a configuration of a function of when the control portion 10 realizes a printer driver may be as shown in FIG. 8.

FIG. 8 is a diagram showing one example of a functional configuration when the control portion 10 according to this modified example realizes a printer driver. It should be noted that functions on an upstream side with respect to the flow of data from the image information generating portion 14, and functions on a downstream side with respect to the flow of data from the color conversion portion 15 are equivalent to the exemplary embodiment and therefore are not shown and description thereof is omitted.

When the image information generating portion 14 generates raster image information by executing rendering processing, this is outputted to a compression portion 141. The compression portion 141 is one example of a compression section according to the present invention and compresses the raster image information that is supplied from the image information generating portion 14 using a specified compression format. However, in regard to background information, the compression portion 141 sometimes carries out irreversible compression by employing a compression format such as a JPEG (joint photographic experts group) format in order to improve the compression ratio, but in regard to overlap drawing information, it is preferable to carry out reversible compression so that content of the color information is not lost. Then the compression portion 141 transfers the compressed image information via an unshown bus and stores it in an unshown image memory.

An expansion portion 142 reads out and obtains the image information stored in the image memory, and restores the image information by executing an expansion process. The color conversion portion 15 obtains the raster image information that has undergone expansion processing by the expansion portion 142 and executes color conversion processing using a procedure equivalent to the foregoing exemplary embodiment.

Figure 9:
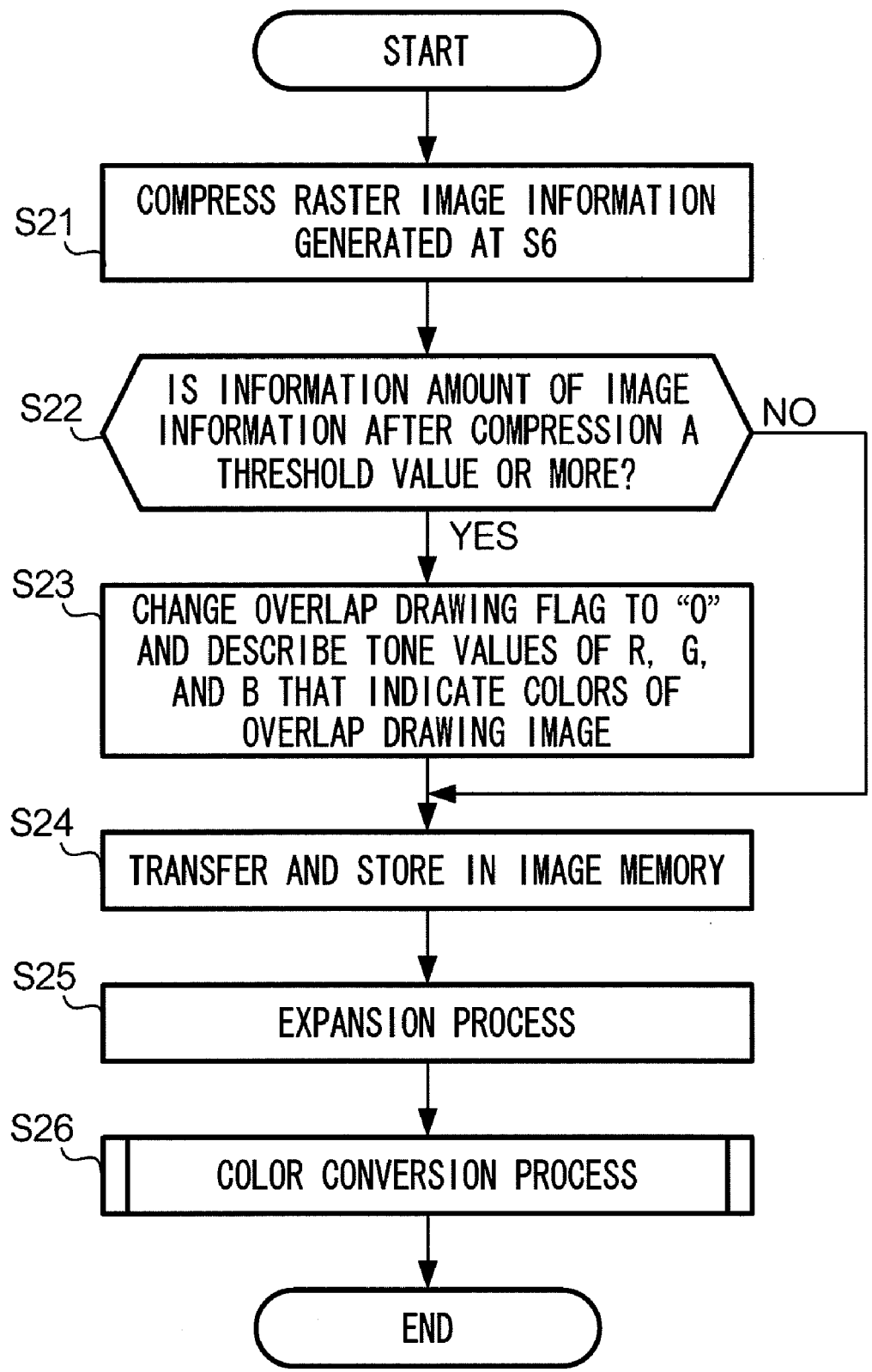
FIG. 9 is a flowchart showing an operational procedure of a rendering process executed by the control portion.

FIG. 9 is a flowchart showing an operational procedure executed by the control portion 10 in a rendering process according to the present modified example.

When raster image information is generated in accordance with a same procedure as steps S1 to S6 in FIG. 4, the control portion 10 compresses this raster image information (step S21). Then, the control portion 10 determines whether or not the information amount of the image information after compression is a threshold value or higher (step S22). This threshold value is determined in consideration of factors such as the storage capacity of the image memory, or an allowed range of transfer times of the bus for example. When it is determined that the information amount of the image information after compression is lower than the threshold value (step S22; no), the control portion 10 transfers the image information to the image memory for storage (step S24). Then, when executing color conversion processing, the control portion 10 reads out the compressed image information (one example of a first set of image information according to the present invention) from the image memory and executes expansion processing (step S25), then executes color conversion processing (step S26) based on the expanded raster image information.

On the other hand, when it is determined at step S22 that the information amount of image information after compression is the threshold value or higher (step S22; yes), the control portion 10 performs rewrites such that the overlap drawing flag described in the flag region TB is changed from "1" to "0" for the pixels contained in the raster image information after the rendering process, and density information described in the density region TC is changed to "00000". That is, the control portion 10 describes (overwrites) the overlap drawing information to an effect that overlap drawing processing is not carried out. Then, the control portion 10 performs description by replacing background information with the tone values of the R, G, and B that express the overlap drawing image (step S23). By doing this, the control portion 10 generates raster image information for forming an image that expresses an overlap drawing image without carrying out overlap drawing processing. Then, the control portion 10 compresses the raster image information and stores it in the image memory (step S24). Then, when executing color conversion processing, the control portion 10 reads out the compressed image information (one example of a second set of image information according to the present invention) from the image memory and executes expansion processing (step S25), then executes "color conversion processing" (step S26) based on the expanded image information. The details of the color conversion processing are as described in the foregoing exemplary embodiment.

As mentioned earlier, depending on the content of raster image information, the information amount thereof sometimes becomes remarkably large, but with the configuration of the present modified example, even in a case where the control portion 10 is to carry out overlap drawing processing, this is interrupted and processing continues such that an image is formed that expresses an overlap drawing image. Accordingly, a situation such as an image requested to be formed by the user not being formed can be avoided, which would be the most disadvantage to the user. In this configuration, it is also possible for the control portion 10 to notify the user to the effect that overlap drawing processing has been interrupted by displaying a message on the UI portion 30 that "black overprinting has been canceled".

Furthermore, in this configuration, it is also possible to perform rendering processing again in a case where the control portion 10 has interrupted the overlap drawing process. That is, the control portion 10 carries out rendering processing (namely, of step S7) as for a case where overlap drawing processing is not carried out based on the intermediate code. Furthermore, conditions for the control portion 10 interrupting overlap drawing processing are not limited to those described above, and for example it is possible to use as a condition setting of an operational mode in which it is desired to inhibit toner consumption amounts, although the details of the condition are not limited to the aforesaid.

3-3. Modified Example 3

In the foregoing exemplary embodiment, the control portion 10 causes an overlap drawing image to be formed using densities specified by density information contained in the overlap drawing information. Instead of this, it is possible for the control portion 10 to fix the density of overlap drawing images to 100%. That is, in regard to pixels targeted for overlap drawing information, the control portion 10 converts the density of overlap drawing images to the tone value (that is, "FF" shown in FIG. 7) of black component that expresses an amount (namely, density of 100%) by which black (K) toner is disposed by the image forming portion 50 in the entire region corresponding to those pixels. Since overlap drawing images are formed so as to overlap background images, the densities thereof are comparatively high, and therefore even if an overlap drawing image whose density is not 100% is altered to a density of 100%, changes tend not to occur in the image in a manner that would be incongruous to the user. With this configuration, the densities can be specified using only the overlap drawing flag without the image forming apparatus 100 carrying out encoding processing and decoding processing, and therefore the amount of processing to be executed by the control portion 10 is reduced. Furthermore, description in the density region TC is unnecessary, and therefore the control portion 10 may describe information for increasing the compression ratio of the raster image information, such as "00000" in the density region.

3-4. Modified Example 4

The image forming apparatus 100 may be provided with both a configuration in which the densities of the overlap drawing image are all set to 100% as described in modified example 3, and a configuration in which the densities of the overlap drawing image are set faithfully as described in the foregoing exemplary embodiment. For example, the user may set an operational mode by operating the UI portion 30 such that the image forming apparatus 100 carries out overlap drawing processing in any form corresponding to the operational mode that has been set. Furthermore, it is also possible to vary the form according to the content of the printer driver realized by the control portion 10. For example, in a case where the control portion 10 generates raster image information having a resolution of 200 dpi (dots per inch) or 300 dpi and outputs this to an image forming apparatus that forms images having a resolution of 600 dpi, information pertaining to resolution conversion is appended to the image information. When this information is appended, the information amount of the image information overall becomes larger compared to a case where it is not present, and therefore in this case, the control portion 10 operates in a form of the modified example 3 in which it is not necessary to append density information such that the information amount of the image information is reduced. On the other hand, if resolution conversion is unnecessary, the information pertaining to the conversion is unnecessary, and therefore the control portion 10 carries out overlap drawing processing in a form described in the exemplary embodiment.

It should be noted that the control portion 10 may switch between operating in any of these forms in response to whether or not there is appended information that increases the amount of image information, other than resolution information, and the control portion 10 may employ any form of overlap drawing processing in response to whether or not an established condition is satisfied.

3-5. Modified Example 5

The image forming apparatus 100 of the foregoing exemplary embodiment forms images using an electrographic system, but the present invention may be applied to image forming apparatuses that form images using other systems such as inkjet systems and offset printing systems.

In the foregoing exemplary embodiment, the control portion 10 generates raster format image information expressed in an RGB color space, but another color space may be used such as a uniform color space (for example, the L*a*b* color space), as long as it is different from the color space defined by the colors of the colorants used by the image forming portion 50. Furthermore, the color space corresponding to the colors of the toners is not limited to CMYK, and other colors such as blue and orange may be used as long as the image forming portion 50 forms images using a black toner and at least one other different type of toner.

Furthermore, in step S11, the control portion 10 performed a conversion from the RGB color space to a CMY color space, but this does not preclude converting to the CMYK color space.

"Black color" in the present invention is not limited to a color entirely without chromaticity or brightness, but includes black colors that are used commonly as black colors, visually, perceptually or the like, despite including chromaticity or brightness. Furthermore, the information amount (number of gradations) of color information in the exemplary embodiments is one example, and this may be determined in response to such factors as the specifications of the apparatus. For example, in a case where a greater amount of color information, such as 64-bit, of the pixels can be maintained than the configurations of the exemplary embodiments, the information amount of the overlap drawing information or the information amount of the background information may be further increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a control section comprising a central processing unit,
an obtaining section, executed by the control section, that obtains data of numerical values or numerical expressions used to describe a drawing process, and
a generating section that generates, based on the data obtained by the obtaining section, image information including color information on a color of each of a plurality of pixels, the image information having a first set of color information that describes at least part of the data using a first color space different from a second color space defined by colors of colorants used by an image forming section, and a second set of color information that specifies an amount of black colorant used by the image forming section for forming each pixel, and the generating section generates overlap information for each pixel based on the second set of color information,
wherein if the amount of black colorant specified by the second set of color information is higher than a first threshold for a given pixel from among the plurality of pixels, the generating section generates the overlap information indicating that the given pixel is subjected to an overlapping drawing, and
if the amount of black colorant specified by the second set of color information is equal to or lower than the first threshold for the given pixel from among the plurality of pixels, the generating section generates the overlap information indicating that the given pixel is not subjected to an overlapping drawing.

2. The image processing apparatus according to claim 1, further comprising:
a color conversion section that converts the color information included in the image information generated by the generating section to output color information described using the second color space defined by the colors of the colorants, the color conversion section converting the color information to the output color information by (i) converting the first set of color information to first output color information described using the second color space defined by the colors of the colorants, (ii) converting, in a case where using the black colorant is specified by the second set of color information, the second set of color information to second output color information of a black component that expresses the amount of the black colorant specified by the second set of color information, and (iii) combining the first output color information and the second output color information to generate the output color information if using the black colorant is specified by the second set of color information, or generating the first output color information as the output color information if using the black colorant is not specified by the second set of color information, and
an output section that outputs the output color information generated by the color conversion section.

3. The image processing apparatus according to claim 2, wherein the color conversion section, in regard to a pixel for which using the black colorant is specified by the second set of color information, converts the second set of color information to black component color information that expresses the amount of the black colorant to be disposed by the image forming section in the entire region corresponding to the pixel.

4. The image processing apparatus according to claim 2, wherein the generating section, in a case where an established condition is satisfied, generates the image information in which are described the first set of color information that expresses a color corresponding to the amount of the black colorant, and the second set of color information that specifies that the black colorant is not used.

5. The image processing apparatus according to claim 2, further comprising:
a compression section that compresses the image information generated by the generating section,
wherein the generating section, in a case where (i) the compression section compresses the image information including the second set of color information that specifies that the black colorant is used, and (ii) an information amount of the image information after compression is a threshold value or higher, generates a second set of image information in which are described the first set of color information that expresses a color corresponding to the amount of the black colorant, and the second set of color information that specifies that the black colorant is not used, wherein the second set of image information is subsequently compressed by the compression section, and
the color conversion section carries out the conversion by expanding the compressed image information when the information amount is smaller than the threshold value, and carries out the conversion by expanding the compressed second set of image information when the information amount is the threshold value or higher.

6. The image processing apparatus of claim 1, wherein the first set of color information indicates a color of an image corresponding to a background image and the second set of color information indicates a color of a different image to be formed overlapping the background image.

7. The image processing apparatus of claim 6, wherein the amount of the black colorant specified by the second set of color information is a density indicating a coverage rate of toner with respect to a unit surface area on a recording medium on which the image is formed by the image forming section.

8. An image forming apparatus, comprising:
an image processing apparatus provided with:
an obtaining section that obtains data of numerical values or numerical expressions used to describe a drawing process,
a generating section that generates, based on the data obtained by the obtaining section, image information including color information on a color of each of a plurality of pixels, the image information having a first set of color information that describes at least part of the data using a first color space different from a second color space defined by, colors of colorants used by an image forming section, and a second set of color information that specifies an amount of black colorant used by the image forming section for forming each pixel, and the generating section generates overlap information for each pixel based on the second set of color information,
wherein if the amount of black colorant specified by the second set of color information is higher than a first threshold for a given pixel from among the plurality of pixels, the generating section generates the overlap information indicating that the given pixel is subjected to an overlapping drawing, and
if the amount of black colorant specified by the second set of color information is equal to or lower than the first threshold for the given pixel from among the plurality of pixels, the generating section generates the overlap information indicating that the given pixel is not subjected to an overlapping drawing,
a color conversion section that converts the color information included in the image information generated by the generating section to output color information described using the second color space defined by the colors of the colorants, the color conversion section converting the color information to the output color information by (i) converting the first set of color information to first output color information described using the second color space defined by the colors of the colorants, (ii) converting, in a case where using the black colorant is specified by the second set of color information, the second set of color information to second output color information of a black component that expresses the amount of the black colorant specified by the second set of color information, and (iii) combining the first output color information and the second output color information to generate the output color information if using the black colorant is specified by the second set of color information, or generating the first output color information as the output color information if using the black colorant is not specified by the second set of color information, and
an output section that outputs the output color information generated by the color conversion section as output image information; and
the image forming section that forms an image corresponding to the output image information outputted by the output section of the image processing apparatus, the image forming section forming a first image using an amount of colorants represented by the first output color information converted by the color conversion section in accordance with the first set of color information, and forming a second image overlapping the first image using the amount of the black colorant represented by the second output color information converted in accordance with the second set of color information.

9. The image forming apparatus of claim 8, wherein the first set of color information indicates a color of an image corresponding to a background image and the second set of color information indicates a color of a different image to be formed overlapping the background image.

10. The image forming apparatus of claim 9, wherein the amount of the black colorant specified by the second set of color information is a density indicating a coverage rate of toner with respect to a unit surface area on a recording medium on which the image is formed by the image forming section.

11. A non-transitory computer readable medium storing a program causing a computer to execute a process, the process comprising:
obtaining data of numerical values or numerical expressions used to describe a drawing process;
generating, based on the obtained data, image information including color information on a color of each of a plurality of pixels, the image information having a first set of color information that describes at least part of the data using a first color space different from a second color space defined by colors of colorants used by an image forming section, and a second set of color information that specifies an amount of black colorant used by the image forming section; and
generating overlap information for each pixel based on the second set of color information, wherein if the amount of black colorant specified by the second set of color information is higher than a first threshold for a given pixel from among the plurality of pixels, the generating the overlap information comprises generating the overlap information indicating that the given pixel is subjected to an overlapping drawing, and if the amount of black colorant specified by the second set of color information is equal to or lower than the first threshold for the given pixel from among the plurality of pixels, the generating the overlap information comprises generating the overlap information indicating that the given pixel is not subjected to an overlapping drawing.

12. The non-transitory computer readable medium of claim 11, wherein the first set of color information indicates a color of an image corresponding to a background image and the second set of color information indicates a color of a different image to be formed overlapping the background image.

13. The non-transitory computer readable medium of claim 12, wherein the amount of the black colorant specified by the second set of color information is a density indicating a coverage rate of toner with respect to a unit surface area on a recording medium on which the image is formed by the image forming section.

* * * * *